United States Patent
Park et al.

(10) Patent No.: US 10,718,114 B2
(45) Date of Patent: Jul. 21, 2020

(54) HIGH-DAMPING REINFORCED CONCRETE (RC) LATTICE BEAM AND SUBSTRUCTURE USING SAME

(71) Applicants: Chan Kyu Park, Gyeonggi-do (KR); Sang Kyung Ahn, Seoul (KR); Yong Ku Kim, Seoul (KR); Hyun Sup Noh, Seoul (KR); Eun Seok Lee, Seoul (KR); Young Kee Lew, Seoul (KR); Byong Kap Jeon, Gyeonggi-do (KR); Jae Eun Jung, Gyeonggi-do (KR)

(72) Inventors: Chan Kyu Park, Gyeonggi-do (KR); Sang Kyung Ahn, Seoul (KR); Yong Ku Kim, Seoul (KR); Hyun Sup Noh, Seoul (KR); Eun Seok Lee, Seoul (KR); Young Kee Lew, Seoul (KR); Byong Kap Jeon, Gyeonggi-do (KR); Jae Eun Jung, Gyeonggi-do (KR)

(73) Assignee: SAMSUNG C&T CORPORATION, Seoul (KR)

( * ) Notice: Subject to any disclaimer, the term of this patent is extended or adjusted under 35 U.S.C. 154(b) by 0 days.

(21) Appl. No.: 15/993,147

(22) Filed: May 30, 2018

(65) Prior Publication Data
US 2019/0127979 A1    May 2, 2019

Related U.S. Application Data

(63) Continuation of application No. PCT/KR2018/000622, filed on Jan. 12, 2018.

(30) Foreign Application Priority Data

Oct. 30, 2017    (KR) .................... 10-2017-0142604

(51) Int. Cl.
*E04C 3/20*    (2006.01)
*E04B 1/21*    (2006.01)
(Continued)

(52) U.S. Cl.
CPC ............ *E04C 3/20* (2013.01); *C04B 26/02* (2013.01); *C04B 28/02* (2013.01);
(Continued)

(58) Field of Classification Search
CPC ..... E04C 3/20; E04B 1/21; E04B 5/04; E04B 2103/02; E04B 5/06; E04B 5/265; E04B 5/263
See application file for complete search history.

(56) References Cited

U.S. PATENT DOCUMENTS 6,148,575 A * 11/2000 Dingler ................ E04G 1/153
249/189
10,378,208 B2 * 8/2019 Sun ......................... E04O 3/36
(Continued)

FOREIGN PATENT DOCUMENTS

JP    63-268834    11/1988
JP    2003-293506 A    10/2003
(Continued)

OTHER PUBLICATIONS

Search Report and Written Opinion for PCT/KR2018/000622 (13 pages). (Year: 2018).*

(Continued)

*Primary Examiner* — Rodney Mintz
(74) *Attorney, Agent, or Firm* — Reinhart Boerner Van Deuren P.C.

(57) ABSTRACT

An RC lattice beam is provided that can greatly dampen the transfer of vibrations in particular. As the concrete included in the RC lattice beam is polymer concrete that contains a polymer, fine-scale vibrations that may otherwise affect exposure apparatuses may be effectively dampened, while the depth of the conventional lattice beam may be kept the same. Thus, a high-damping RC lattice beam is provided that is capable of maximizing the performance of a precision (Continued)

exposure apparatus by reducing the defect rate and improving productivity.

8 Claims, 9 Drawing Sheets

(51) Int. Cl.
| | |
|---|---|
| *E04B 5/06* | (2006.01) |
| *E04B 5/04* | (2006.01) |
| *E04B 5/26* | (2006.01) |
| *C04B 28/02* | (2006.01) |
| *C04B 26/02* | (2006.01) |
| *C04B 41/48* | (2006.01) |
| *C04B 41/63* | (2006.01) |
| *C04B 40/00* | (2006.01) |
| *C04B 111/52* | (2006.01) |

(52) U.S. Cl.
CPC .......... *C04B 40/0039* (2013.01); *C04B 41/48* (2013.01); *C04B 41/63* (2013.01); *E04B 1/21* (2013.01); *E04B 5/06* (2013.01); *C04B 2111/52* (2013.01); *E04B 5/04* (2013.01); *E04B 5/263* (2013.01); *E04B 5/265* (2013.01); *E04B 2103/02* (2013.01)

(56) References Cited

U.S. PATENT DOCUMENTS

| | | | |
|---|---|---|---|
| 2017/0051506 A1* | 2/2017 | An | .......................... E04F 15/18 |
| 2018/0305929 A1* | 10/2018 | Sun | ........................... E04O 3/36 |

FOREIGN PATENT DOCUMENTS

| | | |
|---|---|---|
| JP | 2009-174249 A | 8/2009 |
| JP | 2017-057626 | 3/2017 |
| KR | 1998-047004 | 9/1998 |
| KR | 10-0392188 B1 | 7/2003 |
| KR | 20-0406615 | 1/2006 |
| KR | 10-0855547 | 8/2008 |
| KR | 10-2015-0116128 A | 10/2015 |
| KR | 10-2016-0087217 A | 7/2016 |
| KR | 10-1742539 B1 | 6/2017 |
| WO | WO-2019066136 A1 * | 4/2019 ............... E04B 5/04 |

OTHER PUBLICATIONS

Written Opinion for Korean Application No. 10-2017-0142604 and published version of application (29 pages). (Year: 2019).*

* cited by examiner

HIGH-DAMPING REINFORCED CONCRETE (RC) LATTICE BEAM AND SUBSTRUCTURE USING SAME

CROSS-REFERENCE TO RELATED PATENT APPLICATIONS

This patent application is a continuation of PCT/KR2018/000622, filed Jan. 12, 2018, which claims priority to Korean Patent Application No. 10-2017-0142604, filed Oct. 30, 2017, the entire teachings and disclosure of which are incorporated herein by reference thereto.

FIELD OF THE INVENTION

The present invention relates to an RC lattice beam using high-damping concrete.

BACKGROUND OF THE INVENTION

Recently in the semiconductor industry, there are rapid developments towards higher integration and higher precision in semiconductor memory devices, and as a result, the importance of technologies related to air cleanliness and micro-vibration control is also being emphasized.

An exposure apparatus, which is an essential part of high-tech semiconductor processes in particular, is an apparatus for drawing circuit patterns by irradiating rays onto a circular semiconductor plate known as a wafer. The semiconductor exposure process entails passing the rays through a mask in which the circuit patterns are provided, so that the rays draw the circuit patterns onto the surface of the wafer on which a film of photosensitive liquid is applied. As the rays are irradiated after the mask is placed over the wafer, the rays that pass through the circuit patterns transcribe the circuit patterns onto the wafer.

Here, the exposure process is performed by way of an exposure apparatus called a stepper. When the mask is placed on the stepper and the rays are passed, fine-scale drawings of the electronic circuits are formed over the wafer coated with the photosensitive liquid.

In order to form circuit patterns in an even finer scale, the resolution, also known as the resolving power, of the exposure apparatus has to be increased. The resolving power or resolution refers to the ability of recognizing two adjacent objects as being separate from each other. It is mainly used in representing the performance of an optical device, and in the context of an exposure apparatus for carving circuit patterns onto a wafer, this ability evaluates 'how fine a scale the circuit patterns can be formed in'. Attempting to draw a fine pattern that exceeds the limit of the resolution would incur interference due to the diffraction and the resulting scattering of the rays, so that a distorted image different from the original mask pattern would be formed on the wafer. A chip having a distorted pattern would not be able to function properly.

Until now, a semiconductor exposure apparatus would increase the resolution by using a lens having a higher numerical aperture (NA) or by using a light source of a shorter frequency. Up to the 130 nm semiconductor, a krypton fluoride (KrF) excimer laser having a wavelength of 248 nanometers (nm) was used, and from the 90 nm scale onwards, an argon fluoride (ArF) excimer laser having a wavelength of 193 nm was utilized. With these procedures, various resolution-increasing technologies for reducing interference from the diffraction and scattering of rays were introduced. Some examples of such technologies include the phase shift mask (PSM), which adjusts the intensity and phase of the rays to eliminate diffracted light, and the optical proximity correction (OPC) mask, which artificially modulates patterns where distortions are anticipated so that the correct image is obtained.

The ArF exposure apparatus currently employed in the latest semiconductor production lines utilizes immersion technology, which increases resolution by using a liquid medium having a refractive index (1.44) higher than that of air. However, if the gate line width decreases to 30 nm or lower, the physical ability of the immersion ArF exposure apparatus to implement circuit patterns also reaches its limit.

Gaining attention as a new alternative are extreme ultraviolet (EUV) rays, which is an electromagnetic wave in an intermediate range between ultraviolet (UV) rays and X-rays. The EUV ray intended for use in semiconductor processes was designed to have a wavelength of 13.5 nm. By utilizing the EUV ray having a short wavelength, it is possible to produce semiconductors of lower than 10 nm with a single exposure rather than by multi-patterning. Currently, the only manufacturer developing EUV equipment is the Dutch company ASML, which holds the number one ranking in the semiconductor exposure market.

Korean companies have also started adopting exposure apparatuses that utilize such EUV rays, and when using the EUV exposure apparatus, the patterning operation needs to be performed just once in contrast to the multi-patterning operation required for existing apparatuses using ArF, so that the patterning cost is greatly reduced. When using a 15 mJ dose photosensitive liquid (where millijoule dose is a unit representing how much irradiation is needed for photosensitive response, with a higher value requiring greater irradiation), the cost of the patterning by EUV rays is less than 300% (with the cost of immersion ArF regarded as 100%).

Whereas, in the past, the lattice beams for semiconductor factories were designed to accommodate micro-vibration control in the order of sub-micrometers due to the fact that the wavelength of argon fluoride (ArF) in existing ArF exposure apparatuses is 193 nm, the introduction of the latest exposure apparatuses utilizing EUV rays means that logic chips of less than 10 nanometers can be produced, whereby there is now a demand for vibration control at the level of several nanometers.

Technologies related to micro-vibration control in semiconductor factories can be classified mainly into methods regarding the design of low-vibration building structures, the arrangement and separation of semiconductor manufacturing equipment, vibration-proofing of the vibration source, vibration control of machinery sensitive to vibration, and others. Also, an overall evaluation of the impact of vibrations must be performed from the initial design stage to the final stage of producing a prototype.

A unique structure closely associated with vibration control in a semiconductor factory is the lattice beam, which is used for air cleansing. On this lattice beam structure, an independent vibration control table is installed, and on the independent vibration control table, precision semiconductor production facilities are placed.

Generally, regulations on the permitted levels of vibration in semiconductor factories are also provided in 3 dimensions for different frequencies for both the access floor and the vibration control table, which is the independent isolated foundation on which high-precision exposure apparatuses such as the stepper, aligner, etc. are installed.

When designing a conventional lattice beam, the damping ratio of the structure is fixed to a predetermined value appropriate for the properties of the structure, while the stiffness and mass are set as variables. In other words, in order to effectively control the dynamic response of the lattice beam, the stiffness of the lattice beam structure has to be increased so that the vibration displacement is decreased, and the natural frequency of the lattice beam must be designed higher than the frequency of the external vibration source. Since a high stiffness is needed for satisfying these requirements, a large size is unavoidable.

In such cases, in order to accommodate the level of vibration control performance in the order of several nanometers as needed for introducing the latest exposure apparatuses as described above, the depth of the lattice beam has to be increased. That is, the depth has to be increased by at least twice the depth of the current lattice beam.

However, increasing the depth of the lattice beams would affect the height of the building and would lower manufacturability due to the problems of increased facility sizes, increased curing times, increased difficulty in removing the concrete molds, increased sizes of the lifting and transporting equipment, etc. Also, limitations in the lifting weight would require that structures be divided into smaller modules, leading to increased numbers of lifting steps and decreased workability.

In particular, while the Republic of Korea is expected to become the largest adopter of the latest EUV exposure apparatuses, problems in construction are avoidable at semiconductor facility factories unless the technical problem of enabling ultrafine vibration control is resolved.

Thus, even though the introduction of the latest exposure apparatuses would enable the production of ultra-precision high-integration semiconductors in the order of several nanometers and also allow a twofold increase in productivity compared to existing apparatuses to permit a position of considerable competitive advantage in the global semiconductor market, the current lack of research on lattice beam technology that can realize vibration suppression at the nanometer level poses a technical obstacle. As such, there is an urgent need for lattice beam technology that can overcome this obstacle and realize ultrafine micro-vibration suppression.

[Related Art Document] Korean Patent No. 10-0392188 (Registered Jul. 8, 2003)

BRIEF SUMMARY OF THE INVENTION

Accordingly, to resolve the problem found in the related art, the present invention is intended to provide an RC lattice beam that can dampen ultrafine vibrations while maintaining the size of conventional lattice beams so as to effectively control fine-scale vibrations arriving at an exposure apparatus.

In order to achieve the objective above, according to one aspect of the present invention, there is provided a high-damping RC lattice beam for forming a slab in a floor of a semiconductor factory, wherein a concrete included in the lattice beam is designed to have a damping ratio greater than 15%.

Preferably, the concrete included in the lattice beam is a polymer concrete that contains a polymer mixed therein.

Here, the polymer concrete is preferably a concrete having a water-soluble or dispersed polymer mixed in additionally during a concrete component mixing process, a concrete having a polymer mixed in as a sole binder, or a concrete fabricated by impregnating pores in hardened concrete via a pressurization, depressurization, or gravity-assisted infiltration method.

A substructure having high-damping RC lattice beams according to an embodiment of the present invention includes: studs installed inside a semiconductor factory, where the studs are vertical columns installed in predetermined intervals along longitudinal and lateral directions; a unidirectional beam placed and affixed to the upper portions of two adjacent studs so as to traverse and connect the upper portions of the two adjacent studs; and a lattice beam that has a rectangular shape and is installed to fill in a rectangular horizontal area surrounded by unidirectional beams, wherein the lattice beam includes a polymer concrete that contains a polymer added therein.

Here, the polymer concrete is a concrete having a water-soluble or dispersed polymer mixed in additionally during a concrete component mixing process, a concrete having a polymer mixed in as a sole binder, or a concrete fabricated by impregnating pores in hardened concrete via a pressurization, depressurization, or gravity-assisted infiltration method.

Preferably, the unidirectional beam has an upper portion protruding outward to form a curb on each side along a widthwise direction, the lattice beam has a lower portion thereof protruding outward to form a curb on a perimeter surface, and the lattice beam is installed such that a bottom surface of a perimeter-surface curb of the lattice beam is placed on an upper surface of a side curb of the unidirectional beam.

Here, a plurality of vertical rods are inserted in the stud along a lengthwise direction of the stud, the vertical rods have upper ends thereof protruding beyond an upper surface of the stud, the unidirectional beam has rod insertion holes formed in a bottom surface at each side along a lengthwise direction to receive the protruding upper ends of the vertical rods inserted therein, and the stud is coupled with the unidirectional beam by way of vertical rods inserted into rod insertion holes.

Preferably, two unidirectional beams meeting at the upper portion of a stud each has an upper edge cut off at an end portion of thereof to form a curb, an upper rod exposure space is formed as the curbs meet when the end portions of the two unidirectional beams are connected in an aligned manner at the upper portion of the stud, and the unidirectional beams and the lattice beam are coupled by a concrete injected into the upper rod exposure space, between the unidirectional beams, and between the unidirectional beams and the lattice beam.

Here, the concrete injected into the upper rod exposure space, between the unidirectional beams, and between the unidirectional beams and the lattice beam is preferably a polymer concrete.

An RC lattice beam according to an embodiment of the present invention can provide damping of fine-scale vibration arriving at the latest state-of-the-art exposure apparatuses even for extremely fine vibrations in the order of several nanometers, all while maintaining the thickness of conventional lattice beams. The present invention thus provides the advantageous effect of maximizing the performance of precision state-of-the-art exposure apparatuses by reducing the rate of defects in the produced semiconductors and improving productivity.

DETAILED DESCRIPTION OF THE INVENTION

The descriptions of structures and functions specified in relation to the embodiments of the present invention are provided only as examples by way of which to illustrate the embodiments according to the spirit of the invention, and the embodiments may be practiced in various forms according to the spirit of the invention. The embodiments described herein are not to be interpreted as limiting the present invention, which should be understood as encompassing all modifications, equivalents, and substitutes that do not depart from the spirit and technical scope of the present invention.

A detailed description of the present invention is provided below with reference to the accompanying drawings.

A feature of an embodiment of the present invention is to provide a lattice beam for use as a foundation for an exposure apparatus in a semiconductor factory, wherein the lattice beam provides a vibration damping ratio increased by 15% or more compared to the conventional lattice beam due to the lattice beam being made from a concrete to which a polymer or rubber has been added.

From among the parameters that determine the vibration properties of a concrete, namely the mass, stiffness, and damping, the parameters considered for a conventional type of concrete are mass and stiffness. The reason for this is because it is difficult to modify the damping ratio of the RC concrete itself forming the lattice beam. Therefore, in order to effectively control the dynamic response of the lattice beam, the stiffness of the structure has to be increased so that the vibration displacement is decreased, and the natural frequency has to be designed higher than the frequency of the external vibration source, to avoid the occurrence of resonance as much as possible.

Figure 1:
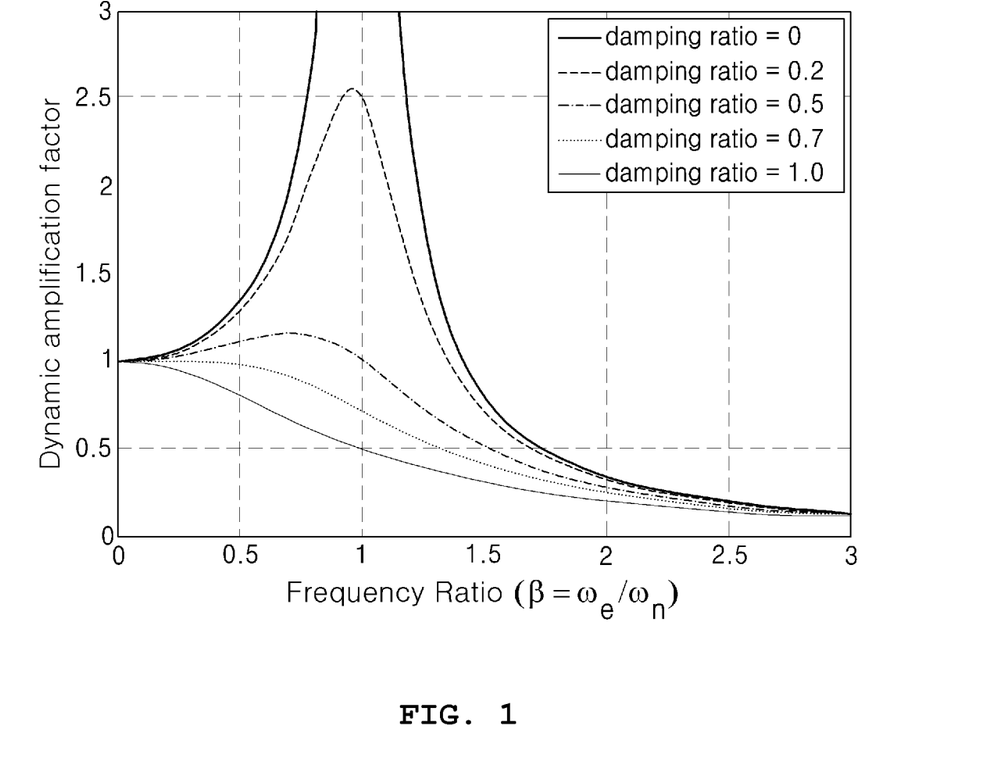
FIG. 1 is a graph representing the relationship between an input frequency to natural frequency ratio and the response of the structure.

Incidentally, FIG. 1 shows a graph in which the damping ratios are fixed to certain values, wherein the graph shows a point at which the response is amplified infinitely as the natural frequency is made closer to the input frequency when there is no damping.

Incidentally, the natural frequency (f) refers to the number of vibrations per unit time and is a concept most typically used to express the dynamic properties of a structure. Generally, the unit of [Hz] is used, to denote the number of vibrations per second (cycles/sec). The natural frequency of a structure is proportional to stiffness (k) and inversely proportional to mass (m).

Resonance refers to the phenomenon of the vibration generated in a structure being amplified when the natural frequency of the structure is close to the operating frequency of a vibration/load applied on the structure. However, it cannot be said that having similar values between the natural frequency and the operating frequency always necessarily causes resonance; the resonance phenomenon occurs only when the operating frequency and the natural frequency are kept similar continuously for a certain duration of time and the directions of the two frequencies affect each other. A structure in which a resonant state is liable to occur should be designed to avoid such resonant state. For example, the tread (pattern of protrusions) on a tire of an automobile consists of grooves for preventing slipping due to moisture at the surface of contact between the tire and the road surface, and when a vibration is created by the tread hitting the road surface, resonance may occur in an automobile part having a natural frequency that coincides with this vibration. In order to prevent such resonance, i.e. to prevent the contact between the tread and the road surface from creating a repeated occurrence of vibrations in a predetermined frequency, the tread pattern is designed to have a very irregular shape. Since the natural frequency is proportional to the stiffness and inversely proportional to the mass of a structure as described above, modifying the natural frequency of a structure requires increasing the stiffness of the structure, decreasing the mass, and redistributing masses within the structure.

Incidentally, the equation of motion of a single degree of motion system may be represented as: $Mx''(t)+Cx'(t)+Kx(t)=F(t)$, where the first term on the left side represents inertial force, and M represents mass.

FIG. 1 is a graph representing the relationship between an input frequency to natural frequency ratio and the response of the structure. As illustrated in FIG. 1, it can be seen that, when there is no damping, the response is infinitely amplified if the natural frequency is close to the input frequency.

As can be observed from the equation above, in order to increase the inertial force while at the same time increasing the stiffness of the structure, increasing the thickness of the lattice beam is unavoidable. To suppress the occurrence of resonance at the nanometer level, the depth of the lattice beam has to be increased at least twofold.

However, an unchecked increase of mass resulting from an increase in thickness of the lattice beam would not only cause a significant drop in workability and a significant increase in costs due to the extra time and effort spent in curing, separating, lifting, and transporting the concrete and the increased sizes of the equipment used, but would also cause problems in the overall safety of the structure, rendering this approach unfeasible.

Also, even though vibration damping devices used in conventional buildings and various electrical panels may provide damping to safeguard a structure against vibrations of large magnitude such as earthquakes, it is impossible to suppress vibration at the level of several nanometers such that precision is guaranteed for state-of-the-art exposure apparatuses that are to be introduced.

In other words, any method based on the related art is as yet unable to provide vibration damping that can ensure the precision of new ultra-precision exposure apparatuses, so that even though the latest exposure apparatuses can dramatically improve the competitiveness of the semiconductor industry in Korea, there is no means by which to ensure the precision of the apparatuses.

Thus, the present invention proposes the approach of applying high-damping polymer concrete to the lattice beam, in order that the term Cx'(t) representing damping force may be utilized as an actual variable.

Portland cement concrete, used as a representative type of construction material, provides economic and structural advantages but also entails the drawbacks of low tensile strength, large drying shrinkage, and low chemical resistance. Types of concrete that are manufactured with the binder partially or entirely substituted by a polymer having a polymeric chemical structure, so as to resolve the drawbacks above, is collectively referred to as a polymer concrete or a concrete polymer composite. Depending on the manufacturing method, a polymer concrete may be classified as a polymer cement concrete (PCC), a polymer concrete (PC), or a polymer impregnated concrete (PIC).

A polymer cement concrete (PCC) is a concrete having a water-soluble or dispersed polymer additionally mixed in during the mixing of regular concrete. The polymeric reaction occurs during the hardening process of the concrete, and depending on the polymer used, heat may be applied from the exterior to promote the hardening. A PCC is often used where high adhesion and durability are required, such as in bridge deck overlays, floor plastering, concrete patching, etc.

A polymer concrete (PC) is a concrete that is manufactured without using cement, instead using only a polymer as the binder for binding the aggregate. It provides significant improvements in bending strength, compressive strength, and tensile strength, provides high strength from early on to allow reduced cross sections and light weight, and offers excellent properties associated with strength and durability such as in terms of wear resistance, shock resistance, chemical resistance, freeze thaw resistance, corrosion resistance, etc., so that it is widely used in various types of structures. Polymer cement mortar provides superior durability compared to conventional cement-based plaster finishing, and there is a growing demand for polymer cement mortar particularly as a repairing material, due to its adequate balance of performance and cost.

Also, the desirable properties are put to use for factory (precast) products such as manholes, FRP composite tubes and panels, high-strength piles, artificial marble, etc., and in on-site casting work such as repairing dam channels, repairing hydroelectric plant spilling basins, casting building foundations in thermal spring regions, etc.

A polymer impregnated concrete (PIC) is a concrete that is manufactured by impregnating a concrete material with a polymer for the purpose of enhancing the qualities of the hardened concrete.

A PIC is obtained by drying the material that will be impregnated, so that spaces are formed into which the polymer may infiltrate, and impregnating the polymer into the cement concrete pores by way of a pressurization, depressurization, or gravity-assisted method. According to the degree of impregnation, the type of PIC is classified as a completely impregnated type and a partially impregnated type. The PIC provides advantages in wear resistance, improved performance as a paving material, improved durability of pre-stressed concrete, etc., and with the purpose of improving the hardness, strength, waterproofing property, chemical resistance, neutralization resistance, wear resistance, etc., of the surfaces of existing concrete structures, is utilized in repair work for freeway paving and dams, waterproofing work for roof slabs, and the like.

The coefficient of elasticity of a polymer concrete is slightly lower than that of regular cement concrete, and the creep properties are more or less the same as those of regular cement, with possible variations according to the type and amount of the polymer binder and according to temperature.

Since the polymer concrete has a near perfect structure in terms of watertightness and airtightness, it provides high resistance against the absorption and infiltration of moisture as well as high resistance against air infiltration.

Also, the polymer concrete allows easy adhesion to various construction materials such as cement concrete, tiles, metal, wood, brick, etc., due to the high adhesive quality of the polymer binder, and provides adequate chemical resistance, wear resistance, shock resistance, and electrical insulation, but provides inadequate flame retardant and endurance properties as the polymer binder contained therein is combustible.

Figure 2:
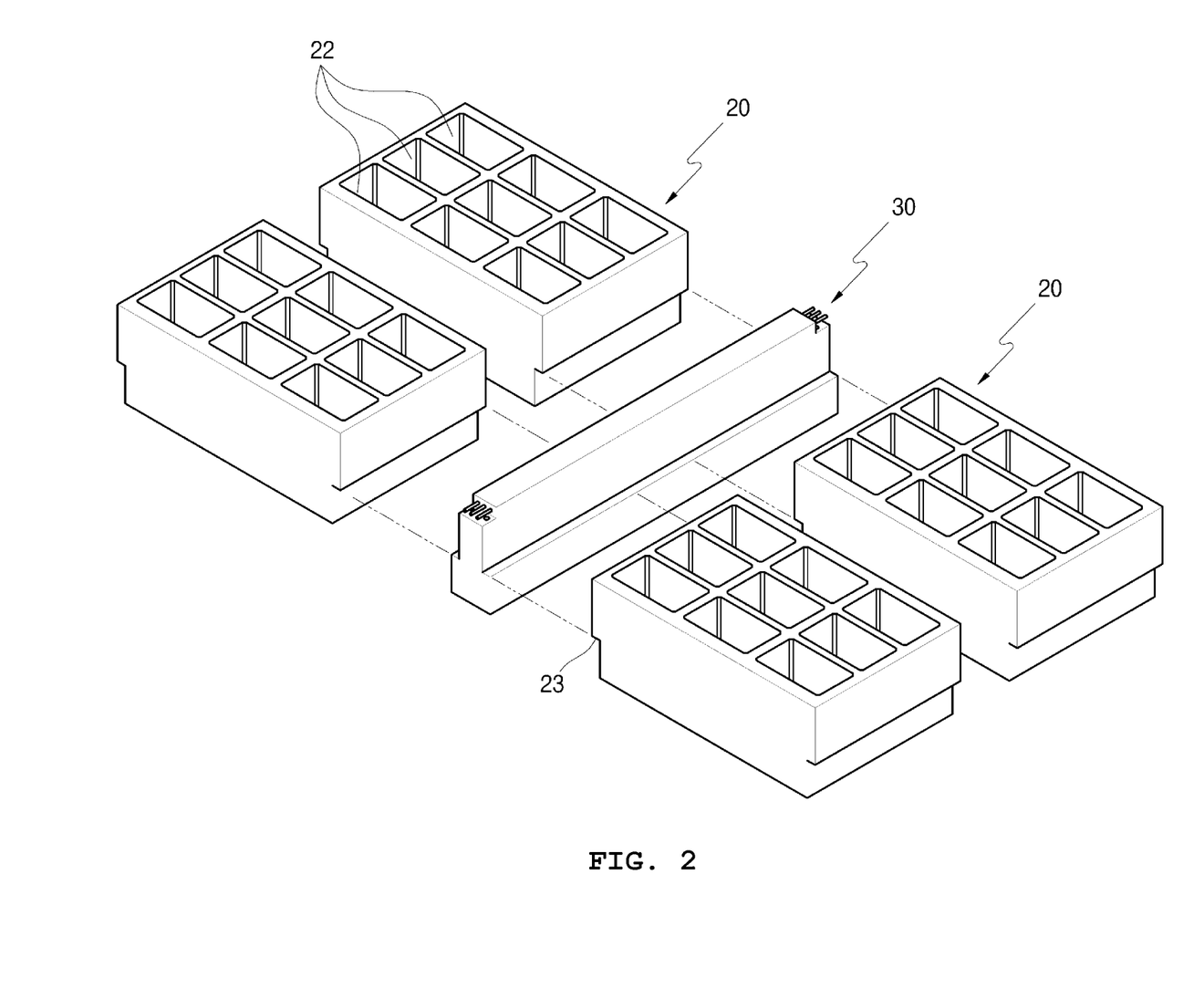
FIG. 2 is an exploded perspective view of a lattice beam structure according to an embodiment of the present invention.
Figure 3:
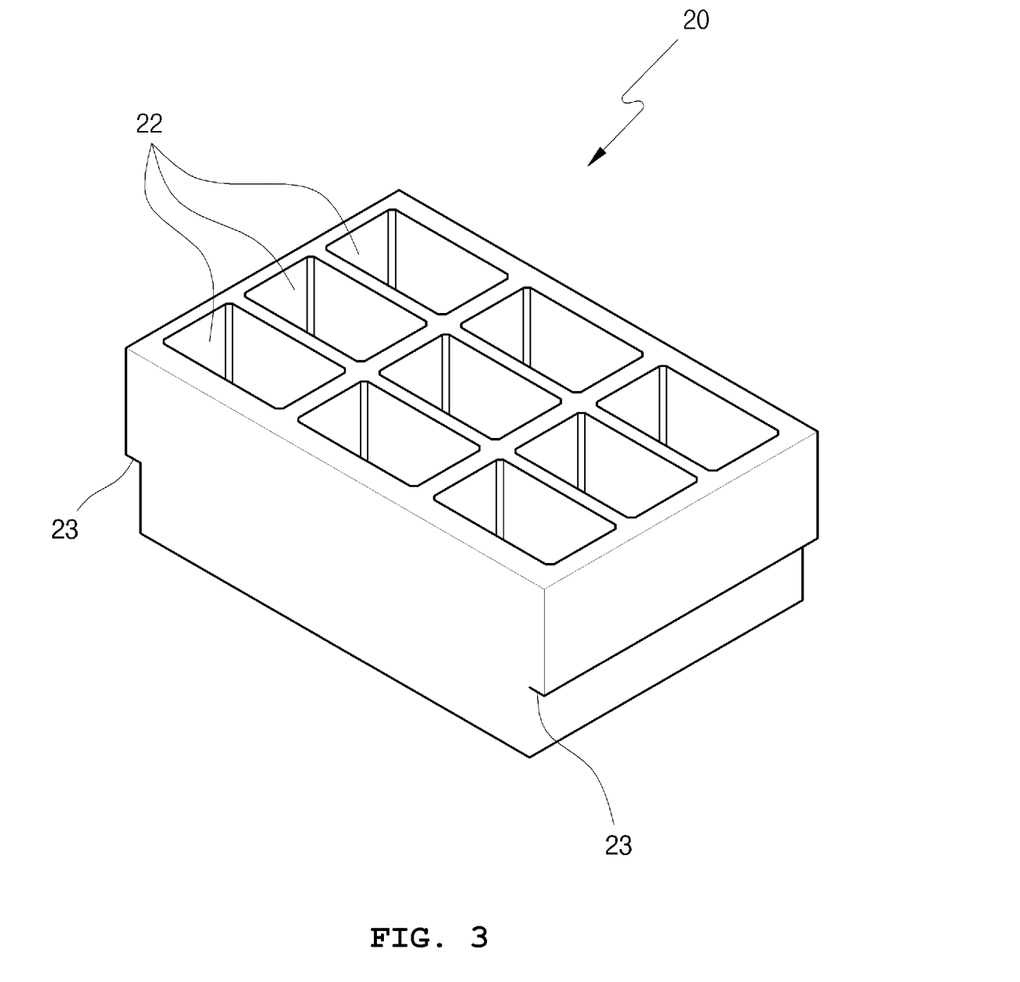
FIG. 3 is a partial perspective view of a lattice beam in a lattice beam structure according to an embodiment of the present invention.

An embodiment of the present invention is to manufacture the lattice beam with such polymer concrete to suppress ultrafine vibrations as much as possible by improving the damping ratio. Incidentally, FIGS. 2 and 3 show a perspective view and a plan view of a lattice beam manufactured from polymer concrete.

When a polymer concrete is adopted, an optimal design may be derived using not only stiffness and mass but also damping as a design variable, making it possible to drastically improve manufacturability, workability, and economic viability.

Next, a description is provided, with reference to the accompanying drawings, of a substructure having high-damping RC lattice beams to which a lattice beam manufactured with a polymer concrete is applied.

A substructure having high-damping RC lattice beams according to an embodiment of the present invention includes studs installed in a vertical direction, unidirectional beams, and lattice beams, as illustrated in FIGS. 2 to 5, where the lattice beams are made from the polymer concrete described above.

Figure 4:
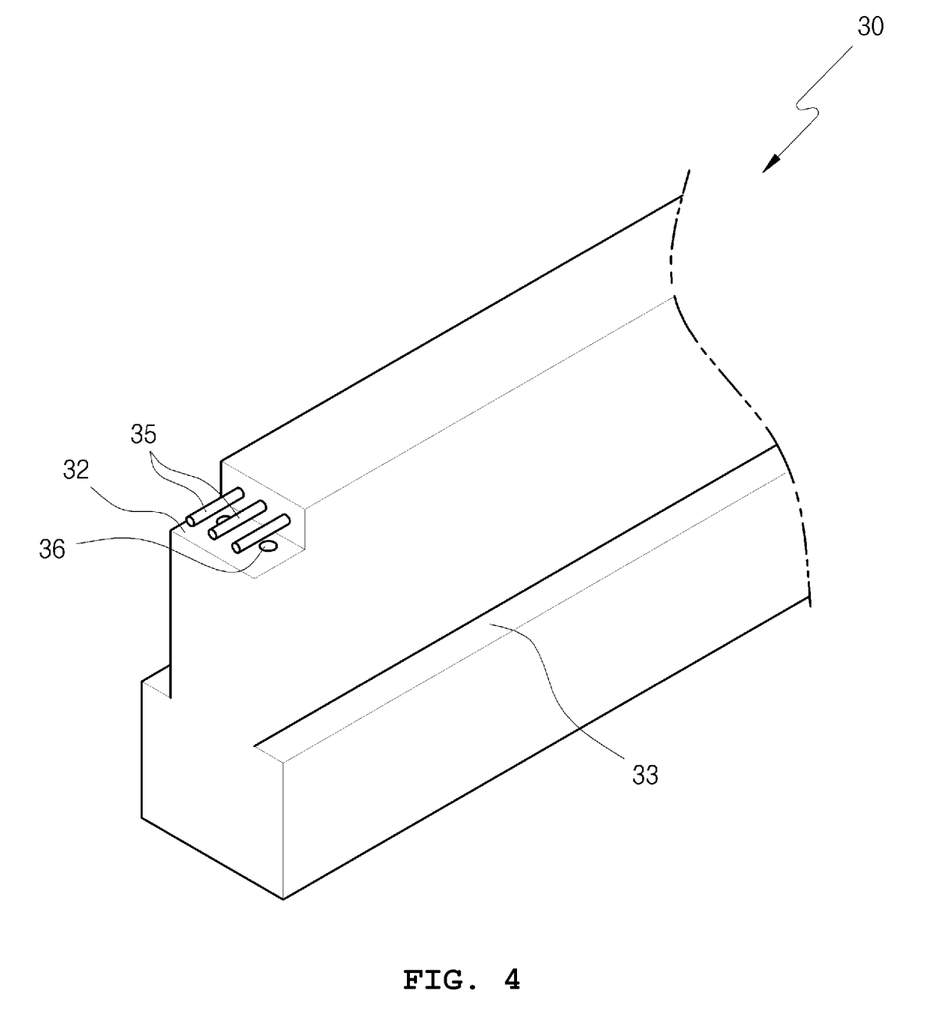
FIG. 4 is a partial perspective view of a unidirectional beam in a lattice beam structure according to an embodiment of the present invention.

Here, a curb of a protruding form is formed on the side of the unidirectional beam 30 as illustrated in FIG. 4, a curb of a subsided or retreated form is formed on the side of the lattice beam 20 as illustrated in FIG. 3, and the lattice beam 20 is installed such that the bottom surface of the side curb of the lattice beam 20 is placed on the upper surface of the side curb of the unidirectional beam 30.

The upper surface of the side curb of the unidirectional beam 30 illustrated in FIG. 4 will be referred to as the 'upper surface 33 of the protruding curb', while the bottom surface of the curb on the side of the lattice beam 20 illustrated in FIG. 3 will be referred to as the 'bottom surface 23 of the retreated curb'.

In an embodiment of the present invention, a concrete 40 is prepared for the coupling of the studs 10, lattice beams 20, and unidirectional beams 30 arranged as above. The concrete 40 is injected into the gap between the end portions of two unidirectional beams 30 that meet at the upper portion of each stud 10 and into the gaps between the side surfaces of the unidirectional beams 30 and the side surfaces of the lattice beams 20, so that the end portions of the unidirectional beams 30 may be attached and secured to each other, and the unidirectional beams 30 and lattice beams 20 may be attached and secured to one another.

Figure 6:
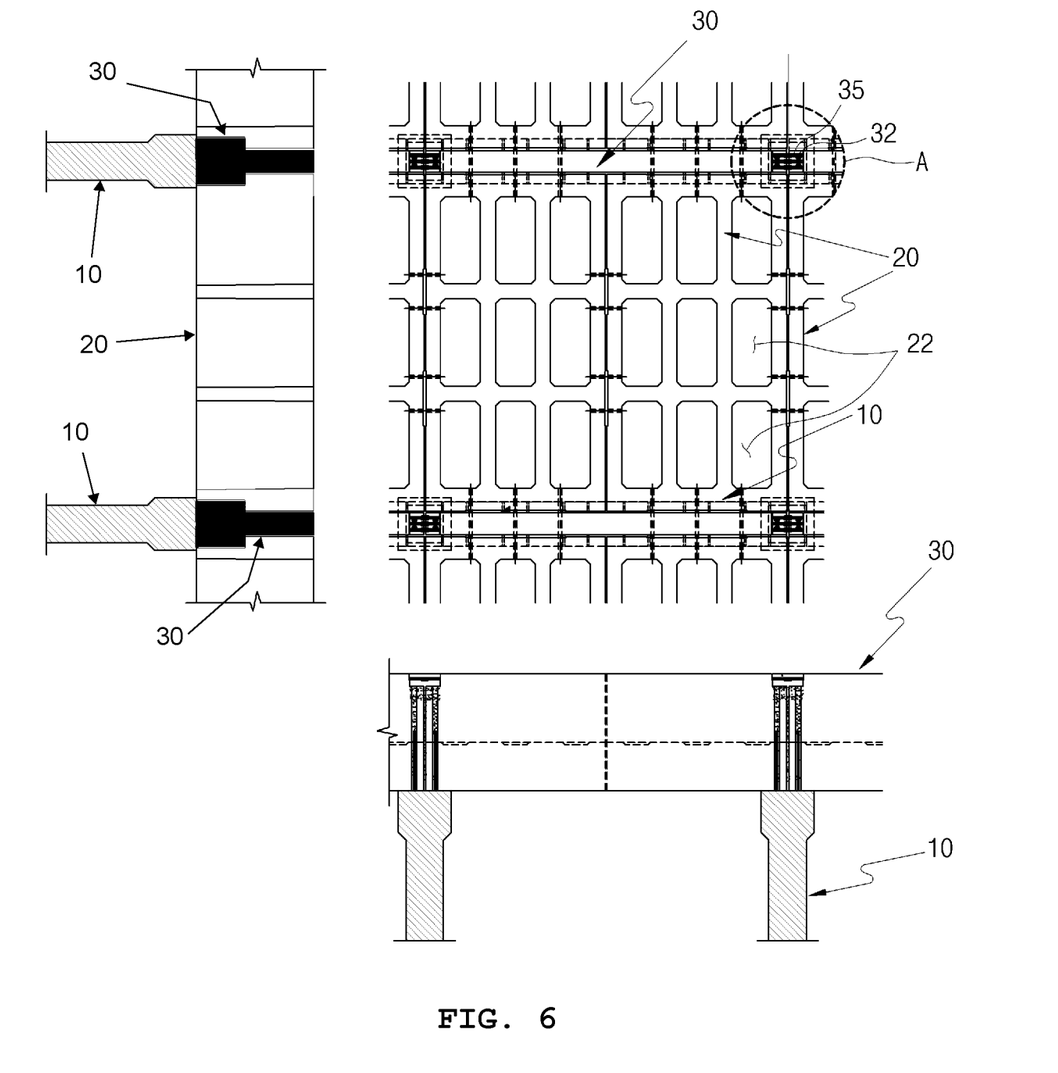
FIG. 6 shows a plan view and cross-sectional views of a lattice beam structure according to an embodiment of the present invention.

The studs 10, which are not shown in the exploded perspective view of FIG. 2, are nevertheless installed under each point where two unidirectional beams 30 are aligned and connected, as illustrated in FIG. 6, and each corner where four lattice beams 20 are coupled together, to thereby support the overall structure.

Figure 5:
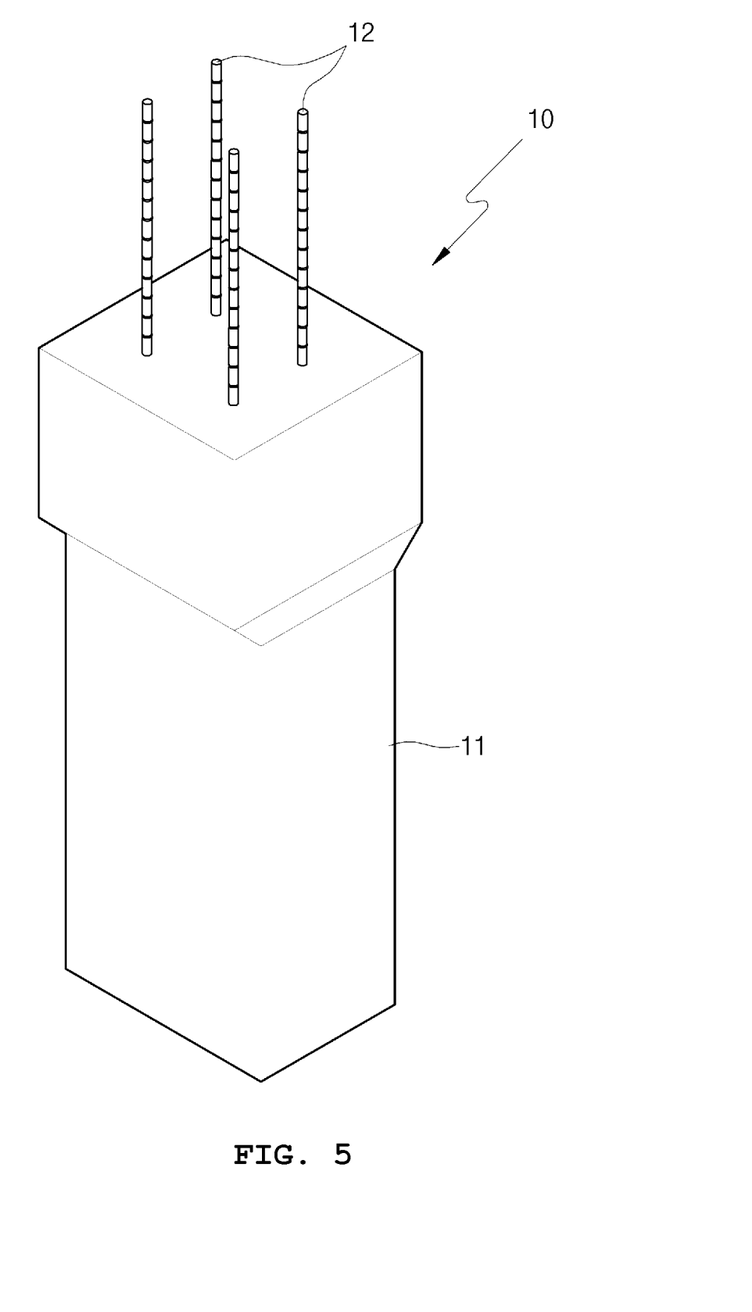
FIG. 5 is a partial perspective view of a stud in a lattice beam structure according to an embodiment of the present invention.
Figure 8:
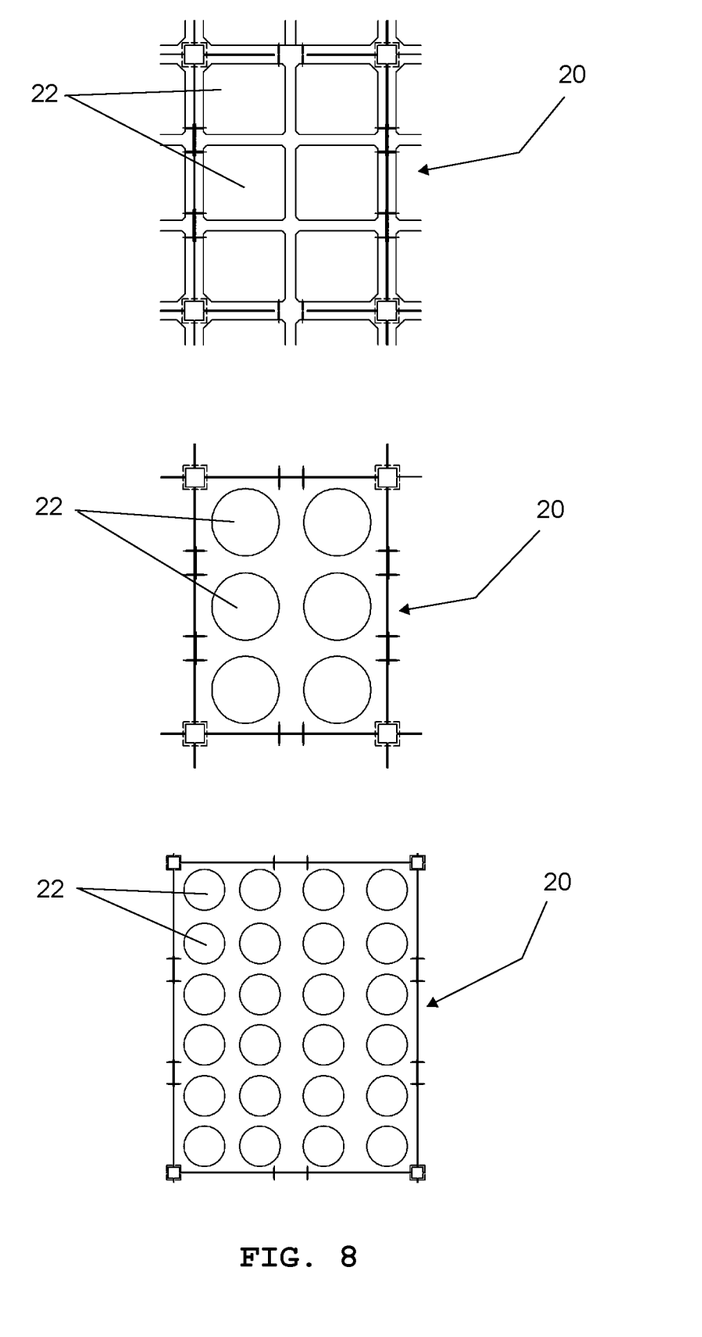
FIG. 8 shows other embodiments of a lattice beam.
Figure 9:
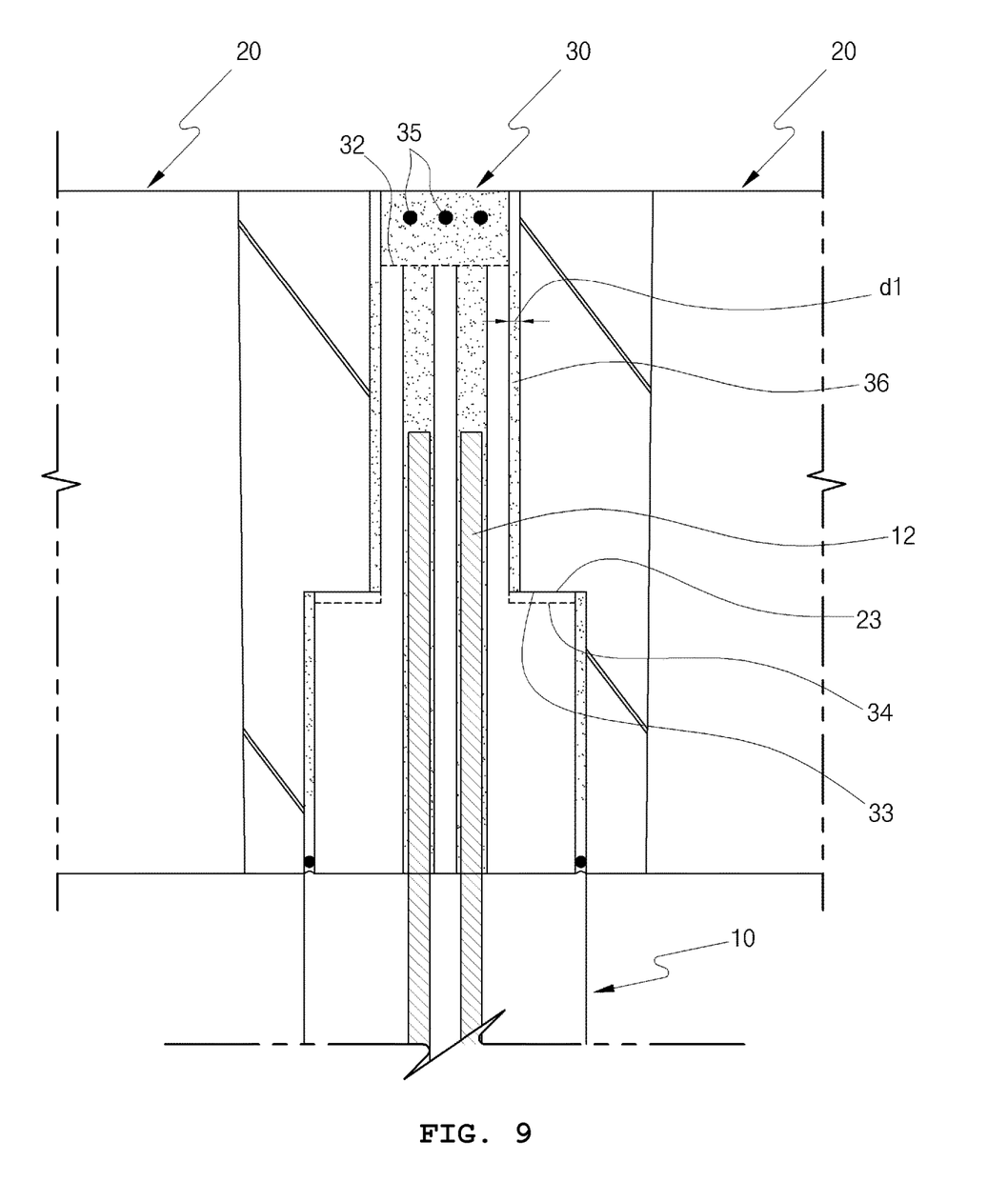
FIG. 9 shows a side cross-sectional view of unidirectional beams.

As illustrated in FIG. 5, a plurality of vertical rods 12 are inserted within the stud 10 along a lengthwise direction of the stud 10, where the upper ends of the vertical rods 12 protrude further beyond the upper surface of the stud 10. As illustrated in FIGS. 8 and 9, vertical rod insertion holes 36 in which to insert the upper ends of the vertical rods 12 are formed in the bottom surface of the unidirectional beam 30 at a part adjacent to the end portion of the unidirectional beam 30, and the vertical rods 12 are inserted into the vertical rod insertion holes 36 until the bottom surface of the part near the end portion of the unidirectional beam 30 rests on the upper surface of the stud 10.

In this way, the stud 10 and the unidirectional beam 30 may be firmly coupled without being separated even when vibrations occur.

Also, each of the two unidirectional beams 30 meeting at the upper portion of a stud 10 has the upper edge cut off at the end portion to form a curb, and when the end portions of the two unidirectional beams 30 are placed adjacently in a row with a predetermined distance in-between at the upper portion of the stud 10, an upper rod exposure space 32 is formed. As concrete 40 is injected into the space formed in the shape of a container as illustrated in FIG. 8, the concrete 40 fills the upper rod exposure space 32, the gap (d2) between the end portions of the two unidirectional beams 30, and the gap (d1) between the unidirectional beams 30 and the lattice beam 20, and couples these components when hardened.

In particular, an embodiment of the present invention may utilize a polymer concrete as the concrete 40 above, to dampen ultrafine vibrations that may be transferred between the unidirectional beams 30 and the lattice beams 2.

Also, as illustrated in FIG. 4, an embodiment of the present invention includes an upper rod exposure space 32 at the end portions of the unidirectional beams 30, where the two unidirectional beams 30 joined in an aligned manner and the four lattice beams 20 coupled to the sides of the unidirectional beams 30 meet together to form a space shaped as a container, as illustrated in FIG. 9, so that when the concrete 40 is injected, not only is the concrete 40 prevented from overflowing onto the upper portions of the unidirectional beams 30, but also the load of the concrete 40 filled in the space formed in the shape of a container enables the concrete 40 to more easily move into the gap (d2) between the end portions of the unidirectional beams 30 and the gaps (d1) between the unidirectional beams 30 and the lattice beam 20. Here, the 'space formed in the shape of a container' corresponds to the upper rod exposure space 32.

The unidirectional beam 30 is manufactured with the vertical rod insertion holes 36 described above penetrating completely from the upper surface of the upper rod exposure space 32 to the bottom surface of the unidirectional beam 30, and as illustrated in FIG. 9, the concrete 40 injected through the upper rod exposure space 32 may also be injected into the vertical rod insertion holes 36 to firmly attach the vertical rods 12 within the vertical rod insertion holes 36, so that the unidirectional beams 30 may be prevented from becoming separated from the upper surface of the stud 10 even when vibrations occur.

Figure 7:
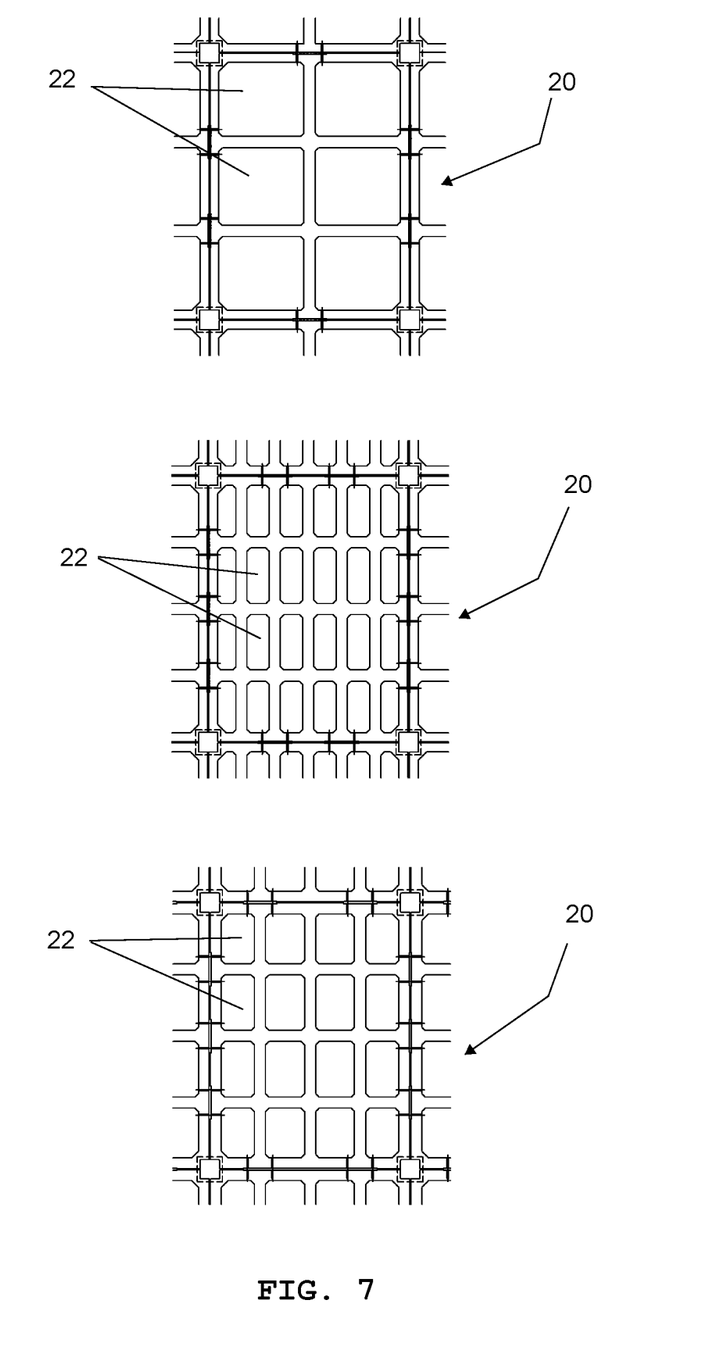
FIG. 7 shows another embodiment of a lattice beam.

The lattice beam manufactured with a polymer concrete according to an embodiment of the present invention is not limited to shape of the lattice beam illustrated in FIGS. 2 and 3, and the lattice shape formed in the lattice beam may be squares or rectangles having various aspect ratios, as in the examples illustrated in FIG. 7. As illustrated in FIG. 8, the lattice shape is not limited to quadrilateral shapes and may be circular, in which case the diameter of the circle may also vary.

The present invention is not limited by the embodiments described above and the accompanying drawings. It should be apparent to the person having ordinary skill in the field of art to which the present invention pertains that various substitutions, alterations, and modifications are possible within a scope that does not depart from the technical spirit of the present invention.

DESCRIPTION OF REFERENCE NUMERALS d1: gap between unidirectional beam and lattice beam
d2: gap between end portions of unidirectional beams
10: stud
12: vertical rod
20: lattice beam
22: cavity
23: bottom surface of retreated curb
30: unidirectional beam
32: upper rod exposure space
33: upper surface of protruding curb
35: upper rod
36: vertical rod insertion hole
37: upper rod fastener
40: concrete All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A substructure having high-damping reinforced concrete (RC) lattice beams, the substructure comprising:
   studs installed inside a semiconductor factory, the studs being vertical columns installed in predetermined intervals along longitudinal and lateral directions;
   a unidirectional beam placed and affixed to upper portions of two adjacent studs so as to traverse and connect the upper portions of the two adjacent studs; and
   a lattice beam of a rectangular shape, the lattice beam installed to fill in a rectangular horizontal area adjacent to the unidirectional beam,
   wherein the lattice beam includes polymer concrete having a polymer added therein,
   wherein the polymer concrete is concrete having a water-soluble or dispersed polymer mixed in additionally during a concrete component mixing process, concrete having a polymer mixed in as a sole binder, or concrete fabricated by impregnating pores in hardened concrete with a polymer via a pressurization, depressurization, or gravity-assisted infiltration method,
   wherein the unidirectional beam has an upper portion thereof protruding outward to form an upper surface of protruding curb on each side along a widthwise direction, the lattice beam has a lower portion thereof protruding outward to form a bottom surface of retreated curb on a perimeter surface thereof, and the lattice beam is installed such that the bottom surface of the retreated curb of the lattice beam is placed on an upper surface of the protruding curb of the unidirectional beam,
   wherein a plurality of vertical rods are inserted into the stud along a lengthwise direction of the stud, the vertical rods have upper ends thereof protruding beyond an upper surface of the stud, the unidirectional beam has rod insertion holes formed in a bottom surface at each side thereof along a lengthwise direction to receive the protruding upper ends of the vertical rods inserted therein, and the stud is coupled with the unidirectional beam by way of vertical rods inserted into rod insertion holes,
   wherein two unidirectional beams meeting at an upper portion of the stud each has an upper edge cut off at an end portion thereof to form a third curb, an upper rod exposure space is formed as the third curbs meet when end portions of the two unidirectional beams are connected in an aligned manner at the upper portion of the stud, and the unidirectional beams and the lattice beam are coupled by a concrete injected into the upper rod exposure space, between the unidirectional beams, and between the unidirectional beams and the lattice beam,
   wherein the concrete injected into the upper rod exposure space, between the unidirectional beams, and between the unidirectional beams and the lattice beam is polymer concrete,
   wherein a plurality of circular lattices are formed in predetermined intervals along longitudinal and lateral directions of the lattice beam.

2. A substructure having high-damping reinforced concrete (RC) lattice beams, the substructure comprising:
   studs installed inside a semiconductor factory, the studs being vertical columns installed in predetermined intervals along longitudinal and lateral directions;
   a unidirectional beam placed and affixed to upper portions of two adjacent studs so as to traverse and connect the upper portions of the two adjacent studs; and
   a lattice beam of a rectangular shape, the lattice beam installed to fill in a rectangular horizontal area adjacent to the unidirectional beam,
   wherein the lattice beam includes polymer concrete having a polymer added therein;
   wherein the unidirectional beam has an upper portion thereof protruding outward to form an upper surface of protruding curb on each side along a widthwise direction, the lattice beam has a lower portion thereof protruding outward to form a bottom surface of retreated curb on a perimeter surface thereof, and the lattice beam is installed such that the bottom surface of the retreated curb of the lattice beam is placed on an upper surface of the protruding curb of the unidirectional beam; and
   wherein a plurality of vertical rods are inserted into the stud along a lengthwise direction of the stud, the vertical rods have upper ends thereof protruding beyond an upper surface of the stud, the unidirectional beam has rod insertion holes formed in a bottom surface at each side thereof along a lengthwise direction to receive the protruding upper ends of the vertical rods inserted therein, and the stud is coupled with the unidirectional beam by way of vertical rods inserted into rod insertion holes.

3. The substructure having the high-damping RC lattice beams according to claim 2, wherein the polymer concrete is concrete having a water-soluble or dispersed polymer mixed in additionally during a concrete component mixing process, concrete having a polymer mixed in as a sole binder, or concrete fabricated by impregnating pores in hardened concrete with a polymer via a pressurization, depressurization, or gravity-assisted infiltration method.

4. The substructure having the high-damping RC lattice beams according to claim 2, wherein a plurality of circular lattices are formed in predetermined intervals along longitudinal and lateral directions of the lattice beam.

5. A substructure having high-damping reinforced concrete (RC) lattice beams, the substructure comprising:
   studs installed inside a semiconductor factory, the studs being vertical columns installed in predetermined intervals along longitudinal and lateral directions;
   a unidirectional beam placed and affixed to upper portions of two adjacent studs so as to traverse and connect the upper portions of the two adjacent studs; and
   a lattice beam of a rectangular shape, the lattice beam installed to fill in a rectangular horizontal area adjacent to the unidirectional beam,
   wherein the lattice beam includes polymer concrete having a polymer added therein;
   wherein the unidirectional beam has an upper portion thereof protruding outward to form an upper surface of protruding curb on each side along a widthwise direction, the lattice beam has a lower portion thereof protruding outward to form a bottom surface of retreated curb on a perimeter surface thereof, and the lattice beam is installed such that the bottom surface of the retreated curb of the lattice beam is placed on an upper surface of the protruding curb of the unidirectional beam; and
   wherein two unidirectional beams meeting at an upper portion of the stud each has an upper edge cut off at an end portion of thereof to form a third curb, an upper rod exposure space is formed as the third curbs meet when end portions of the two unidirectional beams are connected in an aligned manner at the upper portion of the stud, and the unidirectional beams and the lattice beam are coupled by a concrete injected into the upper rod exposure space, between the unidirectional beams, and between the unidirectional beams and the lattice beam.

6. The substructure having the high-damping RC lattice beams according to claim 5, wherein the concrete injected into the upper rod exposure space, between the unidirectional beams, and between the unidirectional beams and the lattice beam is polymer concrete.

7. The substructure having the high-damping RC lattice beams according to claim 5, wherein the polymer concrete is concrete having a water-soluble or dispersed polymer mixed in additionally during a concrete component mixing process, concrete having a polymer mixed in as a sole binder, or concrete fabricated by impregnating pores in hardened concrete with a polymer via a pressurization, depressurization, or gravity-assisted infiltration method.

8. The substructure having the high-damping RC lattice beams according to claim 5 wherein a plurality of circular lattices are formed in predetermined intervals along longitudinal and lateral directions of the lattice beam.

* * * * *